United States Patent [19]

Kohlheb et al.

[11] Patent Number: 4,861,476

[45] Date of Patent: Aug. 29, 1989

[54] SEPARATOR CELL FOR PRESSURE FILTERING AND REVERSE OSMOSIS

[75] Inventors: Robert Kohlheb, Einbeck; Robert Rautenbach, Aachen, both of Fed. Rep. of Germany

[73] Assignee: Amafilter Membrantechnik GmbH, Hanover, Fed. Rep. of Germany

[21] Appl. No.: 867,578

[22] Filed: May 28, 1986

[30] Foreign Application Priority Data

May 28, 1985 [DE] Fed. Rep. of Germany ....... 3519060

[51] Int. Cl.$^4$ .............................................. B01D 13/00
[52] U.S. Cl. ........................... 210/321.76; 210/321.85; 210/456; 55/158
[58] Field of Search .................. 210/321.1, 433.2, 445, 210/456, 321.76, 321.85, 321.75, 321.84; 55/158

[56] References Cited

U.S. PATENT DOCUMENTS

| | | | |
|---|---|---|---|
| 2,864,507 | 12/1958 | Isreeli | 210/321.1 |
| 2,891,900 | 6/1959 | Kollsman | 210/321.75 |
| 3,494,469 | 2/1970 | Kohl et al. | 210/321.84 |
| 3,495,943 | 2/1970 | Kapff | 210/321.2 X |
| 3,556,302 | 1/1971 | Agranat | 210/321.84 |
| 3,560,377 | 2/1971 | Loeffler . | |
| 3,567,028 | 3/1971 | Nose | 210/321.3 X |
| 3,984,324 | 10/1976 | Wang | 210/321.84 |
| 4,202,772 | 5/1980 | Goldstein | 210/321.75 |

OTHER PUBLICATIONS

"Model TCF10/TCF10A Thin Channel Ultrafiltration System", Operating Instructions, Amicon Corp., Publication I-113G, 3/1985.

Primary Examiner—Richard V. Fisher
Assistant Examiner—L. Sue Evans
Attorney, Agent, or Firm—Spencer & Frank

[57] ABSTRACT

A separator cell for pressure filtration and reverse osmosis includes a housing; a filtering membrane supported in the housing and having a feed side and an opposite filtrate side; a flow guide plate supported in the housing and being in a face-to-face engagement with the membrane on the feed side thereof; and a channel in the flow guide plate for guiding fluid. The channel is covered by the membrane. A feed pipe supported in the housing has an outlet and a concentrate discharge pipe supported in the housing has an inlet, both communicating with the channel. A filtrate discharge pipe is supported in the housing and has an inlet at the filtrate side of the membrane. The outlet of the feed pipe and the inlet of the concentrate discharge pipe are situated at generally diametrically opposite locations of the flow guide plate. The channel is constituted by a channel having a shape of a continuous spiral formed of a first and a second turn. The first turn starts at the outlet of the feed pipe and has a curvilinear course of continuously decreasing radius. The second turn is a continuation of the first turn and has a curvilinear course of continuously increasing radius. The second turn terminates at the inlet of the concentrate discharge pipe.

6 Claims, 1 Drawing Sheet

SEPARATOR CELL FOR PRESSURE FILTERING AND REVERSE OSMOSIS

BACKGROUND OF THE INVENTION

The invention relates to a separator cell for pressure filtration and reverse osmosis.

Since the separator cell according to the invention can be used for filtration as well as permeation processes, the term "filtrate" is employed herein also in the sense of "permeate."

The known separator cells for pressure filtration and reverse osmosis are composed of a two-part pressure housing. Such a device is, for example, a TCF-10 model, manufactured by Amicon Corporation, Lexington, Massachusetts. In the known device membrane supported by a filter support is inserted between the upper and lower housing parts and lies against a flow channel which is open toward this membrane and whose ends are connected with an intake pipe and with a concentrate discharge pipe.

The filtrate is discharged through a channel which is connected with the rear side of the membrane. The substance mixture is conducted through the intake pipe perpendicularly onto the membrane while it is conducted away from the membrane, again perpendicularly, through the concentrate discharge pipe. To protect the membrane against wear caused by the inflowing fluid, baffle plates are provided between the intake pipe and the membrane. The flow channel lying against the membrane conducts the fluid over the membrane on a spiral-shaped path. Since the stream in the spiral-shaped flow channel is subjected to centrifugal forces, secondary streams develop which influence the filtration and permeation process in that they reduce its output. Moreover, during ultrafiltration and microfiltration, demixing occurs between the carrier fluid and the suspended particles—if there are differences in density between the particles and the fluid—and this results in polarization phenomena and deposits on the membrane surface. Deposits cause clogging which reduces the throughput capability of the membrane and shortens the service life of the separator cells.

SUMMARY OF THE INVENTION

It is an object of the invention to provide a separator cell of better performance and longer service life than prior art separator cells of this type. In this connection it is important, on the one hand, to substantially exclude secondary streams of fluid on the membrane surface and, on the other hand, to prevent polarization and deposits on the membrane. The separator cell should be suitable for microfiltration and for ultrafiltration, as well as for reverse osmosis and should be usable in the areas of solid-liquid, liquid-liquid, and gas-gas separation. With the appropriate selection of materials, such a cell should be useable up to an operating pressure of about 20,000 kPa and at an operating temperature of up to 150° C.

It is therefore an object of the invention to provide a separator cell, particularly a test separator cell of the above-outlined type which permits, particularly for test purposes, flow over the membrane under conditions close to reality as encountered, for example, in a tubular module, a plate module or also in a coiled module.

This object and others to become apparent as the specification progresses, are accomplished by the invention, according to which, briefly stated, the separator cell for pressure filtration and reverse osmosis includes a housing; a filtering membrane supported in the housing and having a feed side and an opposite filtrate side; a flow guide plate supported in the housing and being in a face-to-face engagement with the membrane on the feed side thereof; and a channel in the flow guide plate for guiding fluid. The channel is covered by the membrane. A feed pipe supported in the housing has an outlet and a concentrate discharge pipe supported in the housing has an inlet, both communicating with the channel. A filtrate discharge pipe is supported in the housing and has an inlet at the filtrate side of the membrane. The outlet of the feed pipe and the inlet of the concentrate discharge pipe are situated at generally diametrically opposite locations of the flow guide plate. The channel is constituted by a channel having a shape of a continuous spiral formed of a first and a second turn. The first turn starts at the outlet of the feed pipe and has a curvilinear course of continuously decreasing radius. The second turn is a continuation of the first turn and has a curvilinear course of continuously increasing radius. The second turn terminates at the inlet of the concentrate discharge pipe.

Thus, in other words, the object of the invention is realized essentially by the use of a structurally specially configured flow plate. This flow plate includes, on the membrane side, a multiply wound flow channel. It is wound in the shape of a meander (S-shaped).

With such a configuration, a positively traversed channel is created for the solution to be separated within the area given by the membrane probe and considered to be the standard. Although this channel includes two changes of direction, its behavior nevertheless corresponds relatively accurately to that of a straight channel. The reason for this is that the changes of direction are arranged counter to one another so that after the first change, the outer flow path becomes the inner flow path and vice versa. Thus, the separator cell is able to give reliable information about the flows and membrane blockages to be expected in industrial modules such as tubular and plate modules, presuming of course that the tests are performed with the same membrane material as contained in the industrial membrane module. If the behavior of coiled modules is to be predicted, a planar spacer having a mesh-like structure, for example a plastic mesh as employed at the inlet end of coiled modules, must be inserted into the channel of the separator cell. The outlet toward the concentrate discharge pipe at the one end of the reversing spiral and the intake from the intake pipe at the other end of the reversing spiral are designed to permit medium to pass through. Both pipes are preferably disposed diametrically opposite one another and are oriented approximately perpendicular to the flow guide plate.

The openings in the inlet pipe and in the concentrate discharge pipe on the side of the membrane are of such configuration that the fluid flows out parallel to the membrane and the concentrate flows into the concentrate discharge pipe also parallel to the membrane. An inlet pipe having such an intake characteristic is preferably configured so that the axially hollowed pipe is laterally recessed, namely in such a manner that the not recessed bottom of the blind bore of the pipe serves as the deflection plate for the inflowing medium. The concentrate discharge pipe may include a similarly formed flow channel. With such a configuration of the channel in the intake and concentrate discharge pipes, particularly heavy loads on the membrane at the points of entrance into the exit from the flow channel can be avoided. This structural feature has a positive effect on the operational life of the membrane. A porous, pressure stable plate, preferably a disc made of a sintered material is used as the membrane support. Sintered glass plates, sintered metal plates as well as sintered plastic plates can be used here. The interior wall of the housing part lying against the porous sintered plate on the filtrate side includes a system of grooves which is connected directly with the flow channel of the filtrate pipe so as to conduct the medium. A preferred variant is a system of grooves which is a combination of radial grooves and spiral-shaped grooves. The filtrate is discharged either through these grooves to the filtrate pipe or it flows directly through the porous membrane support into the filtrate pipe. Since the housing part on the filtrate side and the membrane support can be screwed together, these parts can be placed onto the membrane without the danger of damage to the membrane. The screw connection may be effected, for example, by means of a screw which passes through the filtrate discharge pipe and which leaves open one or more channels for the passage of the permeate or filtrate from the interior of the separator cell into the filtrate discharge pipe.

The membrane of the separator cell may be made of any material used in conventional separator cells; therefore, no membrane materials are listed here.

The flow guide plate is preferably composed of steel or plastic, particularly of polyvinylidene fluoride, polycarbonate or polytetrafluoroethylene. The two pressure housing parts are also preferably composed of steel or plastic, particularly of polyvinylidene fluoride.

The pressure and fluid tight connection between the intake side pressure housing part and the filtrate side pressure housing part is produced by a ring nut with external thread which is inserted into the filtrate side pressure housing part and engages in the internal thread of a sleeve enclosing the two pressure housing parts.

DESCRIPTION OF THE PREFERRED EMBODIMENT

Figure 1:
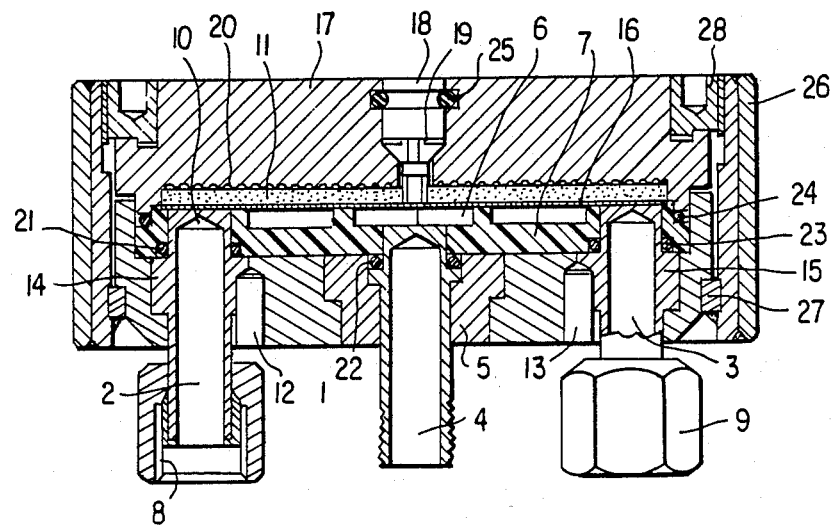
FIG. 1 is an axial sectional view of a preferred embodiment of the invention.

Intake pipe 2, concentrate discharge pipe 3 and an insert 5 accommodating a pipe 4 within it, through which a probe for measuring the temperature in flow channel 6 of flow guide plate 7 can be inserted, are seated in a precise fit in the bottom of the intake side pressure housing part 1 shown in FIG. 1. Intake and concentrate discharge hoses can be screwed by way of screw threads 8 and 9, respectively, to intake pipe 2 and concentrate discharge pipe 3. The pipes 2 and 3 are inserted into flow plate 7 in such a manner that the bores in pipes 2 and 3 open into flow channel 6. The bottom 10 of the bore in intake pipe 2 is tapered to a point and is drilled into the bottom region in such a way that the fluid flows into flow channel 6 in a direction parallel to the membrane surface. The opening in pipe 3 on the flow channel side is configured correspondingly. A change of the direction of flow of the fluid in flow channels 6 prevents membrane 11 from being worn out prematurely as a result of excess mechanical stresses.

The flange-like thickened portions 14 and 15, respectively, in intake pipe 2 and concentrate discharge pipe 3, in conjunction with pins 12 and 13 which engage in these thickened portions, ensure that the pipes are fixed in a manner secure against rotation.

The intake side surface of membrane 11 lies against flow guide plate 7 and thus forms a wall of flow channel 6. The surface of the membrane on the filtrate side lies against a membrane support 16 which can be screwed to housing part 17 on the filtrate side by means of a screw 19 which is inserted into filtrate pipe 18. The housing part on the filtrate side and membrane support 16 can therefore be placed onto membrane 11 in one process step so that the danger of damage to the membrane can be avoided. Screw 19 is provided with ports through which the filtrate is able to flow out of the porous membrane support and out of the system of grooves into filtrate pipe 18. The inwardly oriented surface of housing part 17 on the filtrate side includes a system of grooves 20 which are preferably composed of radial grooves and grooves in a spiral-shaped arrangement. Through this system of grooves, the filtrate can travel into filtrate pipe 18. This system of grooves enhances rapid substance transport from the interior of the separator cell into the filtrate pipe.

The part of the separator cell on the intake side is sealed by sealing rings 21, 22, 23 which are placed onto the pipes. Sealing ring 24 serves the purpose of sealing flow guide plate 7 against housing part 17 on the filtrate side. Filtrate pipe 18 is also sealed by a sealing ring 25.

The separator cell is enclosed by a double-walled, welded steel sleeve 26, with the bottom of housing part 1 on the intake side resting on an abutment ring 27. The separator cell is sealed to be pressure and fluid tight by means of a ring nut 28.

Figure 2:
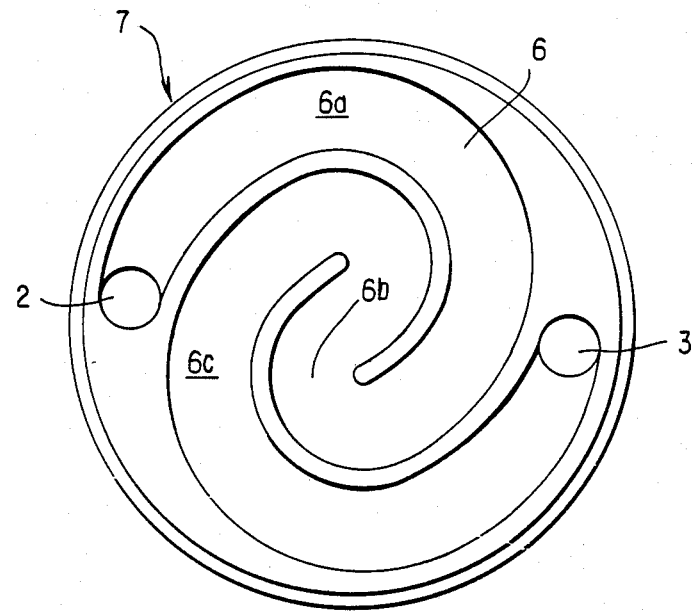
FIG. 2 is a top plan view of a component of the preferred embodiment.

The characteristic configuration of the flow channel 6 disposed in flow guide plate 7 can be seen in FIG. 2. The flow channel has the shape of a reversing spiral which is arranged in a meander pattern. Stated differently, the channel 6 is a continuous spiral made of two consecutive, oppositely oriented full turns. The first turn 6a starts at the intake or feed pipe 2 and has a curvilinear course of continuously decreasing radius until it reaches a zone 6b which is approximately at a center part connecting the ends of the pipes 2 and 3 with one another. From the zone 6b the second turn 6c starts which also has a curvilinear course whose radius continuously increases to its terminus at the concentrate discharge pipe 3. Thus, the channel 6 consists of two consecutive spiral turns of 360° each, wherein the two turns 6a and 6c are of opposite sense. The width of the two-turn channel 6 is sufficiently large so that substantially the entire face of the flow guide plate 7 is occupied by the channel 6. In this way, the resulting flow over the membrane is close to reality as it exists, for example, in a tubular, plate or coiled module.

In the embodiment of the invention described herein, housing parts 1 and 17 are made of steel and flow guide plate 7 is made of polyvinylidene fluoride. The membrane support 16 is a sintered glass plate.

This separator cell can be used at temperatures up to 150° C. and in a medium pressure range up to about 6,000 kPa. However, with the appropriate selection of materials, essentially the same separator cell structure can also be used up into the high pressure range of above 20,000 kPa.

It will be understood that the above description of the present invention is susceptible to various modifications, changes and adaptations, and the same are intended to be comprehended within the meaning and range of equivalents of the appended claims.

I claim:

1. In a separator cell for pressure filtration and reverse osmosis, including a housing; a filtering membrane supported in said housing and having a feed side and an opposite filtrate side; a flow guide plate supported in said housing and being in a face-to-face engagement with said membrane on the feed side thereof; channel means defined in said flow guide plate for guiding fluid therein; said channel means being covered by said membrane; a feed pipe supported in said housing and having an outlet means communicating with said channel means; a concentrate discharge pipe supported in said housing and having an inlet means communicating with said channel means; a filtrate discharge pipe supported in said housing and having an inlet means at the filtrate side of said membrane; the improvement comprising said outlet of said feed pipe and said inlet of said concentrate discharge pipe being situated at generally diametrically opposite locations of said flow guide plate; said channel means comprising a channel having a shape of a continuous spiral formed of a first and a second turn; said first turn starting at the outlet of the feed pipe and having a curvilinear course of continuously decreasing radius; said second turn being a continuation of said first turn and having a curvilinear course of continuously increasing radius; said second turn terminating at the inlet of said concentrate discharge pipe; said channel having a relatively large width for occupying substantially the entire surface area of said flow guide plate oriented towards said membrane.

2. A separator cell as defined in claim 1, wherein said flow guide plate is a plastic.

3. A separator cell as defined in claim 2, wherein said plastic is selected from the group consisting of polyvinylidene fluoride, polycarbonate and polytetrafluoroethylene.

4. A separator cell as defined in claim 1, further comprising a porous membrane support held in said housing and having a first side being in a face-to-face engagement with said membrane at the filtrate side thereof; and a housing part having a surface being in face-to-face engagement with a second side of said porous membrane support; said second side being opposite said first side.

5. A separator cell as defined in claim 4, wherein said porous membrane support plate is of sintered material.

6. A separator cell as defined in claim 4, further comprising a screw securing said housing part and said porous membrane support to one another and being situated in said filtrate discharge pipe in a zone of said inlet thereof.

* * * * *